(12) United States Patent
Von Weihe

(10) Patent No.: US 9,170,990 B2
(45) Date of Patent: Oct. 27, 2015

(54) METHOD AND SYSTEM FOR DOCUMENT RETRIEVAL WITH SELECTIVE DOCUMENT COMPARISON

(71) Applicant: Workshare, Ltd., London (GB)

(72) Inventor: Daniel Von Weihe, London (GB)

(73) Assignee: Workshare Limited, London (GB)

( * ) Notice: Subject to any disclaimer, the term of this patent is extended or adjusted under 35 U.S.C. 154(b) by 87 days.

(21) Appl. No.: 13/803,231

(22) Filed: Mar. 14, 2013

(65) Prior Publication Data
US 2014/0279843 A1 Sep. 18, 2014

(51) Int. Cl.
*G06F 17/30* (2006.01)
*G06F 17/22* (2006.01)

(52) U.S. Cl.
CPC ................................. *G06F 17/2288* (2013.01)

(58) Field of Classification Search
None
See application file for complete search history.

(56) References Cited

U.S. PATENT DOCUMENTS

| | | | |
|---|---|---|---|
| 4,479,195 A | 10/1984 | Herr et al. | |
| 4,949,300 A | 8/1990 | Christenson et al. | |
| 5,008,853 A | 4/1991 | Bly et al. | |
| 5,072,412 A | 12/1991 | Henderson, Jr. et al. | |
| 5,220,657 A | 6/1993 | Bly et al. | |
| 5,245,553 A | 9/1993 | Tanenbaum | |
| 5,247,615 A | 9/1993 | Mori et al. | |
| 5,293,619 A | 3/1994 | Dean | |
| 5,379,374 A | 1/1995 | Ishizaki et al. | |
| 5,446,842 A | 8/1995 | Schaeffer et al. | |
| 5,608,872 A | 3/1997 | Schwartz et al. | |
| 5,617,539 A | 4/1997 | Ludwig et al. | |
| 5,619,649 A | 4/1997 | Kovnat et al. | |
| 5,634,062 A | 5/1997 | Shimizu et al. | |
| 5,671,428 A | 9/1997 | Muranaga et al. | |
| 5,699,427 A | 12/1997 | Chow et al. | |
| RE35,861 E | 7/1998 | Queen | |
| 5,787,175 A | 7/1998 | Carter | |
| 5,801,702 A | 9/1998 | Dolan et al. | |
| 5,806,078 A | 9/1998 | Hug et al. | |
| 5,819,300 A | 10/1998 | Kohno et al. | |
| 5,832,494 A | 11/1998 | Egger et al. | |
| 5,890,177 A | 3/1999 | Moody et al. | |
| 5,898,836 A | 4/1999 | Freivald et al. | |
| 6,003,060 A | 12/1999 | Aznar et al. | |

(Continued)

FOREIGN PATENT DOCUMENTS

| | | |
|---|---|---|
| KR | 10-2004-0047413 | 5/2004 |
| KR | 10-2007-0049518 | 11/2007 |

OTHER PUBLICATIONS

Non-Final Office Action mailed May 17, 2013 in co-pending U.S. Appl. No. 13/306,765 by Mulder, S.P.M., filed Nov. 29, 2011.

(Continued)

*Primary Examiner* — Hung Q Pham
(74) *Attorney, Agent, or Firm* — Ted Sabety, Esq.; Sabety + Associates PLLC

(57) ABSTRACT

This invention discloses a novel system and method for displaying electronic documents on remote devices and enabling collaborative editing where the system upon a request by a user to access a document, automatically determines the latest version of a document that the person had accessed and also whether a newer version had been created. The invention also merges parallel changes that have not been viewed by the user into the comparison result. The invention also includes running a comparison on the two versions and presenting the result to the user.

18 Claims, 4 Drawing Sheets

(56) References Cited

U.S. PATENT DOCUMENTS

| | | |
|---|---|---|
| 6,012,087 A | 1/2000 | Freivald et al. |
| 6,049,804 A | 4/2000 | Burgess et al. |
| 6,067,551 A | 5/2000 | Brown et al. |
| 6,088,702 A | 7/2000 | Plantz et al. |
| 6,145,084 A | 11/2000 | Zuili et al. |
| 6,189,019 B1 | 2/2001 | Blumer et al. |
| 6,212,534 B1 | 4/2001 | Lo et al. |
| 6,219,818 B1 | 4/2001 | Freivald et al. |
| 6,243,091 B1 | 6/2001 | Berstis |
| 6,263,350 B1 | 7/2001 | Wollrath et al. |
| 6,263,364 B1 | 7/2001 | Najork et al. |
| 6,269,370 B1 | 7/2001 | Kirsch |
| 6,285,999 B1 | 9/2001 | Page |
| 6,301,368 B1 | 10/2001 | Bolle et al. |
| 6,321,265 B1 | 11/2001 | Najork et al. |
| 6,336,123 B2 | 1/2002 | Inoue et al. |
| 6,351,755 B1 | 2/2002 | Najork et al. |
| 6,377,984 B1 | 4/2002 | Najork et al. |
| 6,404,446 B1 | 6/2002 | Bates et al. |
| 6,418,433 B1 | 7/2002 | Chakrabarti et al. |
| 6,418,453 B1 | 7/2002 | Kraft et al. |
| 6,424,966 B1 | 7/2002 | Meyerzon et al. |
| 6,449,624 B1 | 9/2002 | Hammack et al. |
| 6,505,237 B2 | 1/2003 | Beyda et al. |
| 6,513,050 B1 | 1/2003 | Williams et al. |
| 6,547,829 B1 | 4/2003 | Meyerzon et al. |
| 6,560,620 B1 | 5/2003 | Ching |
| 6,584,466 B1 | 6/2003 | Serbinis et al. |
| 6,594,662 B1 | 7/2003 | Sieffert et al. |
| 6,614,789 B1 | 9/2003 | Yazdani et al. |
| 6,658,626 B1 | 12/2003 | Aiken |
| 6,662,212 B1 | 12/2003 | Chandhok et al. |
| 6,918,082 B1 | 7/2005 | Gross |
| 7,107,518 B2 | 9/2006 | Ramaley et al. |
| 7,113,615 B2 | 9/2006 | Rhoads et al. |
| 7,152,019 B2 | 12/2006 | Tarantola et al. |
| 7,212,955 B2 | 5/2007 | Kirshenbaum et al. |
| 7,233,686 B2 | 6/2007 | Hamid |
| 7,240,207 B2 | 7/2007 | Weare |
| 7,299,504 B1 | 11/2007 | Tiller et al. |
| 7,356,704 B2 | 4/2008 | Rinkevich et al. |
| 7,434,164 B2 | 10/2008 | Salesin et al. |
| 7,496,841 B2 | 2/2009 | Hadfield |
| 7,564,997 B2 | 7/2009 | Hamid |
| 7,624,447 B1 | 11/2009 | Horowitz et al. |
| 7,627,613 B1 | 12/2009 | Dulitz et al. |
| 7,680,785 B2 | 3/2010 | Najork |
| 7,694,336 B2 | 4/2010 | Rinkevich et al. |
| 7,796,309 B2 | 9/2010 | Sadovsky et al. |
| 7,857,201 B2 | 12/2010 | Silverbrook et al. |
| 7,877,790 B2 | 1/2011 | Vishik et al. |
| 7,890,752 B2 | 2/2011 | Bardsley et al. |
| 8,005,277 B2 | 8/2011 | Tulyakov et al. |
| 8,042,112 B1 | 10/2011 | Zhu et al. |
| 8,181,036 B1 | 5/2012 | Nachenberg |
| 8,196,030 B1 | 6/2012 | Wang et al. |
| 8,233,723 B2 | 7/2012 | Sundaresan |
| 8,286,085 B1 | 10/2012 | Denise |
| 8,301,994 B1 | 10/2012 | Shah |
| 8,473,847 B2 | 6/2013 | Glover |
| 8,635,295 B2 | 1/2014 | Mulder |
| 2002/0010682 A1 | 1/2002 | Johnson |
| 2002/0019827 A1 | 2/2002 | Shiman et al. |
| 2002/0023158 A1 | 2/2002 | Polizzi et al. |
| 2002/0052928 A1 | 5/2002 | Stern et al. |
| 2002/0063154 A1 | 5/2002 | Hoyos et al. |
| 2002/0065827 A1 | 5/2002 | Christie et al. |
| 2002/0065848 A1 | 5/2002 | Walker |
| 2002/0073188 A1 | 6/2002 | Rawson |
| 2002/0087515 A1 | 7/2002 | Swannack et al. |
| 2002/0099602 A1 | 7/2002 | Moskowitz et al. |
| 2002/0120648 A1* | 8/2002 | Ball et al. .................... 707/511 |
| 2002/0129062 A1 | 9/2002 | Luparello |
| 2002/0136222 A1 | 9/2002 | Robohm |
| 2002/0159239 A1 | 10/2002 | Amie et al. |
| 2003/0037010 A1 | 2/2003 | Schmelzer |
| 2003/0061260 A1 | 3/2003 | Rajkumar |
| 2003/0093755 A1 | 5/2003 | O'Carroll |
| 2003/0112273 A1 | 6/2003 | Hadfield |
| 2003/0115273 A1 | 6/2003 | Delia et al. |
| 2003/0131005 A1 | 7/2003 | Berry |
| 2003/0158839 A1 | 8/2003 | Faybishenko et al. |
| 2003/0233419 A1 | 12/2003 | Beringer |
| 2004/0122659 A1 | 6/2004 | Hourihane et al. |
| 2004/0128321 A1 | 7/2004 | Hamer |
| 2004/0261016 A1 | 12/2004 | Glass et al. |
| 2005/0038893 A1 | 2/2005 | Graham |
| 2006/0005247 A1 | 1/2006 | Zhang et al. |
| 2006/0021031 A1 | 1/2006 | Leahy et al. |
| 2006/0059196 A1 | 3/2006 | Sato et al. |
| 2006/0064717 A1 | 3/2006 | Shibata et al. |
| 2006/0112120 A1 | 5/2006 | Rohall |
| 2006/0171588 A1 | 8/2006 | Chellapilla et al. |
| 2006/0190493 A1 | 8/2006 | Kawai et al. |
| 2006/0218004 A1 | 9/2006 | Dworkin et al. |
| 2006/0224589 A1 | 10/2006 | Rowney et al. |
| 2006/0271947 A1 | 11/2006 | Lienhart et al. |
| 2007/0005589 A1 | 1/2007 | Gollapudi |
| 2007/0011211 A1 | 1/2007 | Reeves et al. |
| 2007/0027830 A1 | 2/2007 | Simons et al. |
| 2007/0112930 A1 | 5/2007 | Foo et al. |
| 2007/0220068 A1 | 9/2007 | Thompson et al. |
| 2007/0261112 A1 | 11/2007 | Todd et al. |
| 2007/0294612 A1 | 12/2007 | Drucker et al. |
| 2008/0033913 A1 | 2/2008 | Winburn |
| 2008/0080515 A1 | 4/2008 | Tombroff et al. |
| 2008/0219495 A1 | 9/2008 | Hulten et al. |
| 2008/0301193 A1 | 12/2008 | Massand |
| 2008/0320316 A1 | 12/2008 | Waldspurger et al. |
| 2009/0030997 A1 | 1/2009 | Malik |
| 2009/0034804 A1 | 2/2009 | Cho et al. |
| 2009/0052778 A1 | 2/2009 | Edgecomb et al. |
| 2009/0064326 A1 | 3/2009 | Goldstein |
| 2009/0083384 A1 | 3/2009 | Bhogal et al. |
| 2009/0129002 A1 | 5/2009 | Wu et al. |
| 2009/0177754 A1 | 7/2009 | Brezina et al. |
| 2009/0187567 A1 | 7/2009 | Rolle |
| 2009/0216843 A1 | 8/2009 | Willner et al. |
| 2009/0222450 A1 | 9/2009 | Zigelman |
| 2009/0234863 A1 | 9/2009 | Evans |
| 2009/0241187 A1 | 9/2009 | Troyansky |
| 2010/0011077 A1 | 1/2010 | Shkolnikov et al. |
| 2010/0017404 A1 | 1/2010 | Banerjee et al. |
| 2010/0017850 A1 | 1/2010 | More et al. |
| 2010/0064372 A1 | 3/2010 | More et al. |
| 2010/0070448 A1 | 3/2010 | Omoigui |
| 2010/0083230 A1 | 4/2010 | Ramakrishnan |
| 2010/0174678 A1 | 7/2010 | Massand |
| 2010/0174761 A1 | 7/2010 | Longobardi et al. |
| 2010/0235763 A1 | 9/2010 | Massand |
| 2010/0241943 A1 | 9/2010 | Massand |
| 2010/0318530 A1 | 12/2010 | Massand |
| 2011/0029625 A1 | 2/2011 | Cheng et al. |
| 2011/0141521 A1 | 6/2011 | Qiao |
| 2011/0145229 A1 | 6/2011 | Vailaya et al. |
| 2012/0016867 A1* | 1/2012 | Clemm et al. ................ 707/722 |
| 2012/0036157 A1 | 2/2012 | Rolle |
| 2012/0117096 A1 | 5/2012 | Massand |
| 2012/0133989 A1 | 5/2012 | Glover |
| 2012/0136862 A1 | 5/2012 | Glover |
| 2012/0136951 A1 | 5/2012 | Mulder |
| 2012/0151316 A1 | 6/2012 | Massand |
| 2012/0317239 A1 | 12/2012 | Mulder |
| 2013/0007070 A1 | 1/2013 | Pitschke |
| 2013/0060799 A1 | 3/2013 | Massand |
| 2013/0227397 A1 | 8/2013 | Tvorun |
| 2014/0136497 A1 | 5/2014 | Georgiev |
| 2014/0280336 A1 | 9/2014 | Glover |
| 2014/0281872 A1 | 9/2014 | Glover |

OTHER PUBLICATIONS

Non-Final Office Action mailed Aug. 13, 2013 in co-pending U.S. Appl. No. 13/306,819 by Glover, R.W., filed Nov. 29, 2011.

(56) References Cited

OTHER PUBLICATIONS

Tsai, et al., "A document Workspace for Collaboration and Annotation based on XML Technology", Department of Electrical Engineering, 2001, pp. 165-172.

Roussev, et al., "Integrating XML and Object-based Programming for Distributed Collaboration", IEEE, 2000, pp. 254-259.

XP-002257904, "Workshare Debuts Synergy", 2003, 3 pages.

PC Magazine "Pure Intranets: Real-Time Internet Collaboration", Aug. 30, 2001.

Non-Final Office Action Mailed May 7, 2008 in Co-pending U.S. Appl. No. 10/023,010, filed Dec. 17, 2001.

Final Office Action Mailed Apr. 17, 2007 for U.S. Appl. No. 10/023,010, filed Dec. 17, 2001, Issued U.S. Pat. No. 7,496,841.

International Search Report of PCT Application No. PCT/US2010/043345, Apr. 28, 2011, 3 pages.

Non-Final Office Action Mailed Mar. 16, 2006 for U.S. Appl. No. 10/023,010, filed Dec. 17, 2001, Issued U.S. Pat. No. 7,496,841.

Restriction Requirement Mailed Feb. 14, 2005 for U.S. Appl. No. 10/023,010, filed Dec. 17, 2001, Issued U.S. Pat. No. 7,496,841.

Restriction Requirement Jun. 30, 2006 for U.S. Appl. No. 10/136,733, filed Apr. 30, 2002.

Wells et al., "Groupware & Collaboration Support", www.objs.com/survey/groupwar.htm, Aug. 30, 2001, 10 pages.

Microsoft, "Microsoft XP, Product Guide", pp. 1-26.

International Search Report of PCT Application No. PCT/IB2002/005821, Jan. 3, 2004, 6 pages.

Non-Final Office Action Mailed Mar. 20, 2006 in Co-pending U.S. Appl. No. 10/136,733, filed Apr. 30, 2002.

Notice of Allowance Mailed Oct. 24, 2008 in Co-pending U.S. Appl. No. 10/023,010, filed Dec. 17, 2001.

\* cited by examiner

Document ID

| User ID 1 | Access Time Stamp | Version ID | W | File Pointer 1 |
|---|---|---|---|---|
| User ID 2 | Access Time Stamp | Version ID | W | File Pointer 2 |
| User ID 3 | Access Time Stamp | Version ID | R | File Pointer |
| | | | | |

Figure 2

METHOD AND SYSTEM FOR DOCUMENT RETRIEVAL WITH SELECTIVE DOCUMENT COMPARISON

FIELD OF INVENTION

The present invention generally relates to the field of digital document review. More particularly, the present invention relates to methods and systems for detecting changes and/or differences between an original document and a modified version of the document.

BACKGROUND

In several scenarios, one or more users may go through multiple revisions of a document to improve the content and presentability of the document contents. As a result of their being more than one user authorized to access and modify a document, other users may become confused when requesting to see a document if they are not aware that the document has changed and how. In doing so, a user may wish to compare a latest version of the document with a prior version to determine the changes that have been made to the latest version. Other limitations of existing or prior systems will become apparent to those of skill in the art upon reading the following Detailed Description.

At least one embodiment of this invention pertains to a document management service that enables a user to request a document from the service to be delivered to a remote computer and have the service compare the last version of the document that the user accessed with the latest version and to deliver a display document showing those changes The document management service may run as a standalone service on a user's computing device or, in some instances, may run as a web service on a remote server. In either scenario, the document management service receives as input a request for particular document that a user wishes to see. The service determines whether the current version of the document supersedes the version of the document that the requesting user has previously seen. Subsequent to receiving the requests, the compare service generates a comparison document by identifying differences between the latest version of the document and the version that the requesting user has previously seen. The compare service delivers to the user's computer the comparison result. These and other objects, features and characteristics of the present invention will become more apparent to those skilled in the art from a study of the following detailed description in conjunction with the appended claims and drawings, all of which form a part of this specification. It should be understood that the description and specific examples are intended for purposes of illustration only and not intended to limit the scope of the present disclosure.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

01. Flow chart depicting the basic architecture of the process.
02. Example access history data table associated with a document.
03. Example document revision history schematic
04. Example document revision history as a tree structure.

DETAILED DESCRIPTION

Figure 1:
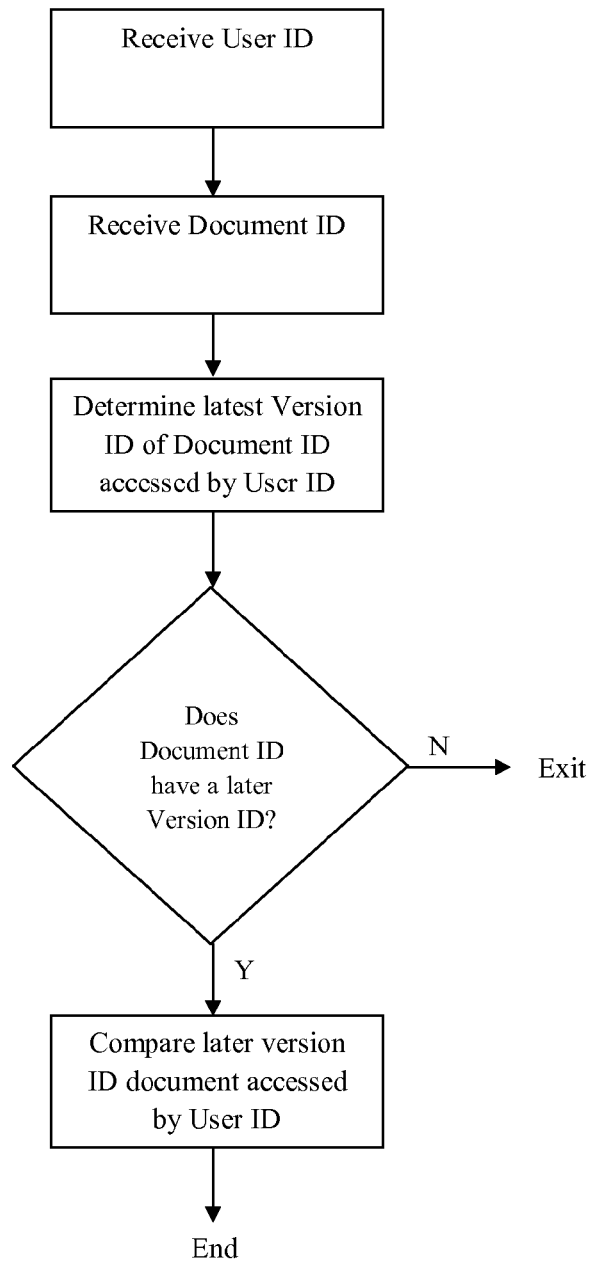

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

The method and system operates on one or more computers, typically using one or more servers and one or more remote user's computing devices. A customer's device can be a personal computer, mobile phone, mobile handheld device like a Blackberry™ or iPhone™ or a tablet device like the iPad™ or Galaxy™ or any other kind of computing device a user can use to view and edit an electronic document. The user devices are operatively connected to the remote server using a data network. The invention does not require that the data network be in continuous contact with the remote file server. The invention works in conjunction with a document collaborative editing system (CES) or document management systems, (DMS) or both. For brevity, references to the DMS in the disclosure may disclose processes that may be performed by the CES or the CES in combination with the DMS. The system can be embodied in a client/server architecture, whereby an executable code operates on the user's remote device and interacts with processes operating on a server. In other embodiments, the same system can be running on the user's remote device by means of scripts or apps that are downloaded and executed within an Internet web-browser.

The user's remote computer is operatively connected to a data communication network, typically the Internet. This may be directly or indirectly through another network, for example a telephone network or a private data network. The user operates a client software on their computing device that communicates with the server that operates the process as a service, or the server that delivers documents for editing or review, that is the DMS or CES.

When the client requests to view a document available on the DMS, the request is received and processed on the DMS. In this case, the user's device may select a document title from a graphical user interface displayed on the screen of the device. The DMS maintains all of the revisions of the document in its data storage repository. Each time the CES saves a new version, that is a new computer file. That new file typically has a different filename than the prior version. The system also keeps track of the date and time that the version was stored. The system maintains a separate database that keeps track of each user authorized to access the document on the CES and their access of the document. For example, FIG. 2 shows a data table assigned to a given document, with a Document ID. That table shows a list of user ID's and then the time they accessed the document, which version of the document and whether it was for a read or a write. When a user with an identifier of USERID accesses the document referred to as DOCUMENT ID, then a new row in the table is created. That row is populated with the time stamp for the access, and which VERSION ID associated with the DOCUMENT ID was accessed. If the access was to read the document then the R/W flag is set to R. For each VERSION ID, there is a corresponding file pointer that refers to the data file containing that version of the document. While a simple data table is presented, other data structure organizations may be used to store the access history of the document. This access history is used by the process to determine which revisions of the document a particular user has not seen.

Figure 3:
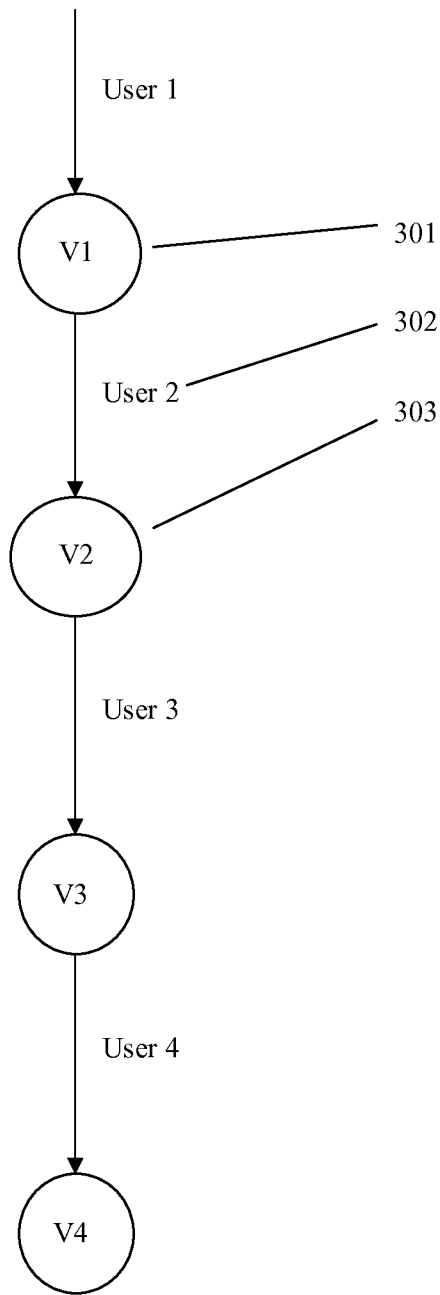
Figure 4:
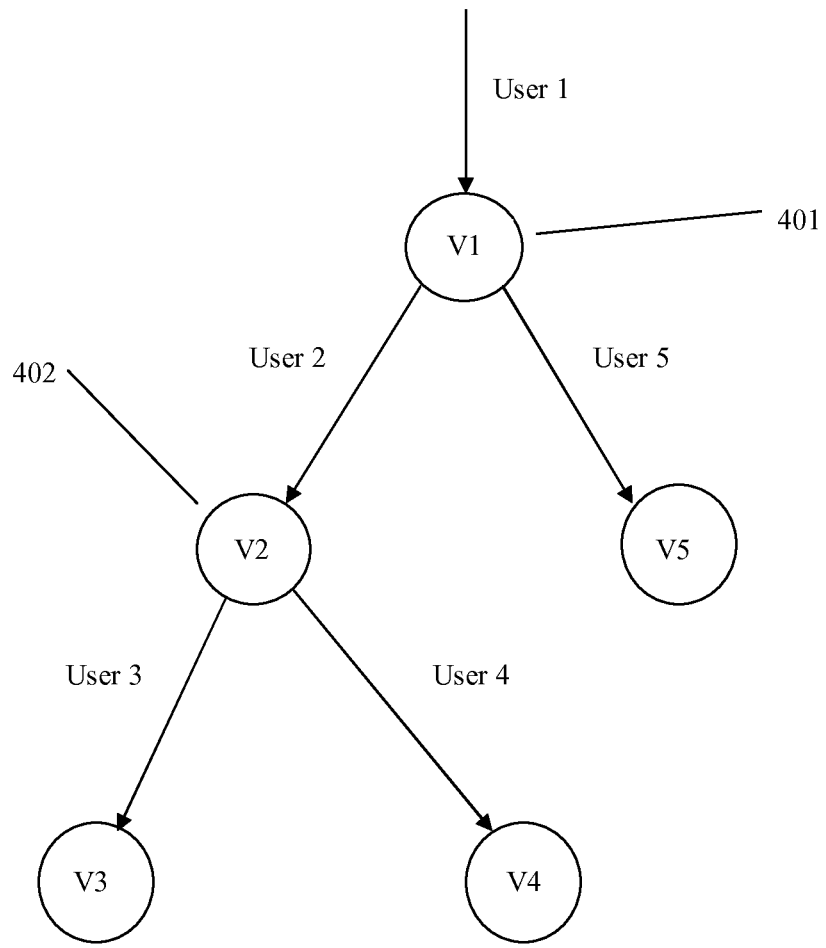

Returning to the user interface, the user can select a document to review by name. The system can then determine which version to deliver. For example, it may be that the user wishes to see the last version of the document they worked on. However, as shown in FIG. 3, in the case of a user 1, who creates a document and releases it into CES environment, that document may go through several revisions instituted by several people in the group. In this example, the document version 1 (301) gets revised by user 2 (302) who thereby creates version 2 of the document (303). FIG. 4 shows the situation where a document gets revised such that there are more than one sets of revision history. FIG. 2 shows how each version has a VERSIONID that can be stored in the activity database. So in the example of FIG. 3, the USER1 entry has a W entry on the creation of VERSION 1 of the document. In the next row, USER2 has an entry for the creation of VERSION 2 of the document. Similarly, other users can have entries showing that they accessed a particular version of the document for reading, which would be indicated by an R in the last column. A user may have more than one row in the table: this would indicate the user accessing the document an additional time.

In the typical system, the user logs into a CES using a username and password, or similar computer security mechanism. The CES confirms the identity of the user in typical fashion, for example, by looking in a database to obtain a password string corresponding to the username and confirming that they match. In any case, the system obtains a USERID for that user. Through a typical graphical user interface, the user can request to see a document. This can be by means of opening a directory listing, accessing a most recently used list, or using a typical document management system tool that lists documents associated with a client or project. As a result of such a request, the system then obtains a DOCUMENT ID. The DOCUMENT ID may be a filename or other identifier associated with the set of files constituting a document and its revisions, as indicated in FIGS. 3 and 4.

The system then uses the access history associated with the DOCUMENT ID to determine the latest VERSION ID that the user has accessed. As shown in FIG. 2, the system can search for the lowest row that the USERID can be found. Then it can retrieve from the table the VERSION ID. The system can then continue down the table rows looking for a newer VERSION ID. If one is found, then by definition, that VERSION ID is later than the one the user accessed. Otherwise, the same USERID would occupy that row. Practitioners will recognize that other data structures may be used to store the dependencies of the access history and other kinds of algorithms may be used to identify the last version that a user has accessed and whether there is a later version.

Upon determining the version of the document that the user last accessed and the latest version, the system can present the user the choice of either opening the older document, opening the newer document, or opening a comparison document that compares the later version of the document to the version the user had last seen. This last step requires running a comparison between the two versions of the document. Document comparison may be accomplished using a string matching algorithm, that is, one that begins trying to match the character strings in a document file to the character strings in the other document file. Document comparison can be further enhanced by ignoring certain characters, for example, spaces, new line characters and certain formatting characters. Document comparison can be even further enhanced by creating data structures out of the document text that model the document as a hierarchy of component paragraphs and sections, and comparing these first, to account for paragraphs being moved within the document, and then only showing comparisons of the text in the paragraph.

Once the compared document is presented to the user, the user can make changes to the document and save it as yet a newer version. In this case the system will generate a new data file comprising the new version is of the document is created and a new VERSION ID. When a new version of the document is created, it's a distinct document data file. The USERID, the new VERSION ID and the W entry are entered into the access history table. A pointer to the file is also included into the table. Alternatively, the user may simply read the document with no changes. In the first case, a new row entry is made in the access history table that indicates a new VERSION ID and a W (write) access and the file pointer to the new file. In the second case, the new row entry is made with the same VERSION ID entered and a R (read) access.

In one embodiment, the system works with a document where for any version of the document, there is one parent version and one child version, except for the first version and the last version. See FIG. 3. In this embodiment, the latest version of the document is the last in the series, that is, the newest version number or VERSION ID. In another embodiment, the system may have versions of the document where a document may have one parent, but more than one child version. This occurs when a version of the document is opened by two different users who then save their versions of the document as distinct versions. See FIG. 4.

In this second embodiment, there arises the determination of what the latest version of the document is, for the purposes of running the comparison. All of the candidate latest versions would appear as leaf nodes in the schematic shown in FIG. 4. Each node in the tree hierarchy represents a version of the document. Each edge linking the nodes represents a user that modified a parent version to create a child version. Selecting from this set can be accomplished in several ways, depending on the utility being sought.

1. The simplest approach is to select the VERSIONID with the latest time-stamp. In this case, the system will work down the access history table looking for the row. A W (write) in particular the row that has the latest access time stamp. The VERSION ID and file pointer for that row is used to retrieve the document.
2. Another approach is to consider the selection of the version akin to selecting a leaf node on the basis of the path from the initial version (or root node) to the leaf. In this case, the leaf node that is on a path that includes the requesting USERID can be selected. This would entail working through the access history keeping track of the hierarchical structure, typically by means of using a stack to process the hierarchical structure.

3. In yet another approach, the selection can be the leaf node that is the end point of a path that includes the originator of the document (other than the first or root version). In this case, the system looks for the path where an interim version was represented by a entry in the table where the USERID matches the USERID associated with the first VERSIONID.

4. In yet another approach, the selection can be the leaf node that is the endpoint of a path that includes a version created by a USERID associated with some pre-determined seniority value. In this example, the USERID of the version creator may be a senior manager that is determined to be sufficiently important as to have some predetermined value associated with their USERID. Each time the system tests a node, the system can retrieve this seniority value from a database that stores information about the USERID, and can compare that seniority value against some predetermined value. In yet another embodiment, the user making the request for the document can select or input the seniority value to be used for that comparison.

5. In yet another approach, the leaf node that is a member of a path that contains a version node that is associated with a preference value that meets a pre-determined value. For example, a senior manager in a document management system may select a version and input a selection that tells the system the "use this version". This value can be stored in another column of the access history table. However, that version may be revised again, in which case the leaf node that is downstream from that preferential selection may be the appropriate version to use for the comparison.

6. In yet another approach, the requesting user can select which of the leaf versions to use. In one embodiment, the system analyzes the access history data to determine which VERSION IDs have no child versions. The user interface presents a hierarchical structure, similar to FIG. 4, and the user can view for each node, the author of that version and its time stamp. From that presentation, the user can input a selection of one of the leaf nodes as the latest version for the comparison.

In yet another embodiment, the features disclosed herein can be arranged so that the system performs the following steps:

1. When a user opens a file from either the a web app or desktop application, and
   If there has been a new version of this file, and
   Posted by anyone other than this user, and
   Later in time than when the file was last viewed by this user, then
2. The system asks the user if they would like to see what's new in the file.
3. If the user's responds in the affirmative the system:
   Compares the last version they viewed with the most recent version, and
   Produces a comparison report that highlights the changes.
4. The user may then save, download, forward or comment on the comparison report.
5. If the user returns to the file view again from either user interface, and the version has not changed again, regardless of whether or not they ran the report on the previous visit, the system does not ask the user because the activity data indicates that they have now seen the latest version. In yet another embodiment, the system also determines whether the latest second version has at least one related version in the tree structure relationship where such related version is not an ancestor document to the second version, and in dependence thereon, selecting at least one of the related versions, merging the changes in the at least one related versions into the second latest version in order to cause the comparison presented to the requesting user to contain a compilation of the merged changes.

Operating Environment:

Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, minicomputers, mainframe computers, and the like. Indeed, the terms "computer," "server," and the like are used interchangeably herein, and may refer to any of the above devices and systems.

In some instances, especially where the mobile computing device 104 is used to access web content through the network 110 (e.g., when a 3G or an LTE service of the phone 102 is used to connect to the network 110), the network 110 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

The user's computer may be a laptop or desktop type of personal computer. It can also be a cell phone, smart phone or other handheld device, including a tablet. The precise form factor of the user's computer does not limit the claimed invention. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The system and method described herein can be executed using a computer system, generally comprised of a central processing unit (CPU) that is operatively connected to a memory device, data input and output circuitry (I/O) and computer data network communication circuitry. A video display device may be operatively connected through the I/O circuitry to the CPU. Components that are operatively connected to the CPU using the I/O circuitry include microphones, for digitally recording sound, and video camera, for digitally recording images or video. Audio and video may be recorded simultaneously as an audio visual recording. The I/O circuitry can also be operatively connected to an audio loudspeaker in order to render digital audio data into audible sound. Audio and video may be rendered through the loudspeaker and display device separately or in combination. Computer code executed by the CPU can take data received by the data communication circuitry and store it in the memory device. In addition, the CPU can take data from the I/O circuitry and store it in the memory device. Further, the CPU can take data from a memory device and output it through the I/O circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Further, a server may be virtual, whereby several software instances each operating as an independent server are housed in the same hardware computer. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML or scripting languages that are executed by Internet web-browsers) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and inter-networking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the specification is intended only to provide an extremely detailed disclosure of the present invention and is not intended to be limiting.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Also, while processes or blocks are at times shown as being performed in series, these processes or blocks may instead be performed or implemented in parallel, or may be performed at different times.

What is claimed:

1. A method executed by a computer system for providing a user a comparison output of a document embodied in at least three versions stored on the system comprising:
    determining a first, second and third version of the document using a tree data structure representing a version hierarchy resulting from a history of revisions to the document where a first version of the document is associated with a second and a third versions of the document, each of the second and third versions being descendant versions to the first version and neither the second nor third versions being ancestor versions of each other;
    automatically making a selection of one of either the second or third version of the document based on a predetermined selection rule; and
    generating a comparison output between the first version and the selected second or third version of the document.

2. The method of claim 1 further comprising determining whether the selected second or third version has at least one additional related versions where such at least one related versions are not an ancestor version of the selected second or third version, and merging the changes in the at least one related versions into the selected second or third version in order to cause the comparison output to contain a compilation of the merged changes.

3. The method of claim 1 where the predetermined selection rule selects the one of the second or third versions such that an identifier associated with the requesting user is associated as an author of an ancestor version of the selected second or third version.

4. The method of claim 1 where the predetermined selection rule selects the one of the second or third versions that represents a leaf node in the version hierarchy that is the end point of a path in the hierarchy that includes a non-root version node that is associated with a corresponding author that is the originator of the document.

5. The method of claim 1 where the predetermined selection rule selects the one of the second or third versions that represents a leaf node in the version hierarchy that is the endpoint of a path in the hierarchy that includes a version node associated with a corresponding reference value that meets a pre-determined threshold.

6. The method of claim 5 where the predetermined value encodes a seniority level and the threshold is a minimum seniority level.

7. The method of claim 5 where the predetermined value encodes a requirement to select the version associated with the version node.

8. The method of claim 1 where the predetermined selection rule selects the one of the second or third version that represents a leaf node in the version hierarchy that is the endpoint of a path in the hierarchy that contains a version node that is associated with a corresponding preference value that meets a pre-determined value.

9. The method of claim 1 where the predetermined selection rule selects the one of the second or third version that is associated with a later time stamp.

10. A computer system for providing a user a comparison output of a document embodied in at least three versions stored on the system comprising:
    a component configured to determine a first, second and third version of the document using a tree data structure stored in computer memory representing a version hierarchy resulting from a history of revisions to the document, where a first version of the document is associated with a second and a third versions of the document, each of the second and third versions being successor versions to the first version and neither the second nor third versions being ancestor versions of each other; said determining component further adapted to automatically make a selection of either the second or third version of the document based on a predetermined selection rule; and a component configured to generate a comparison output between the first version and the selected second or third version of the document.

11. The system of claim 10 further comprising a component configured to determine whether the selected second or third version has at least one additional related versions where such at least one related versions is not an ancestor version of the selected second or third version, and merge the changes in the at least one related versions into the selected second or third version in order to cause the comparison output to contain a compilation of the merged changes.

12. The system of claim 10 where the predetermined selection rule selects the one of the second or third versions such that an identifier associated with the requesting user is associated as an author of an ancestor version of the selected second or third version.

13. The system of claim 10 where the predetermined selection rule selects the one of the second or third versions that represents a leaf node in the version hierarchy that is the end point of a path in the hierarchy that includes a non-root version node that is associated with a corresponding author that is the originator of the document.

14. The system of claim 10 where the predetermined selection rule selects the one of the second or third versions that represents a leaf node in the version hierarchy that is the endpoint of a path in the hierarchy that includes a version node associated with a corresponding reference value that meets a pre-determined threshold.

15. The system of claim 10 where the predetermined selection rule selects the one of the second or third version that represents a leaf node in the version hierarchy that is the endpoint of a path in the hierarchy that contains a version node that is associated with a corresponding preference value that meets a pre-determined value.

16. The system of claim 15 where the predetermined value encodes a seniority level and the threshold is a minimum seniority level.

17. The system of claim 15 where the predetermined value encodes a requirement to select the version associated with the version node.

18. The system of claim 10 where the predetermined selection rule selects the one of the second or third version that is associated with a later time stamp.

* * * * *